Oct. 14, 1958    J. C. LINDH    2,855,728
PIPE CUTTING AND BEVELING MECHANISM
Filed Sept. 28, 1955    2 Sheets-Sheet 1

INVENTOR.
JOHN C. LINDH
BY
ATTORNEYS

INVENTOR.
JOHN C. LINDH

United States Patent Office 2,855,728
Patented Oct. 14, 1958

2,855,728

PIPE CUTTING AND BEVELING MECHANISM

John C. Lindh, Lester, Pa.

Application September 28, 1955, Serial No. 537,152

8 Claims. (Cl. 51—3)

This invention relates to pipe cutting and beveling mechanism and is particularly adapted to the cutting and beveling of pipes ranging widely in diameter and wall thickness.

One of the objects of the present invention is to provide a mechanism particularly adapted for use at the location of a construction job for the cutting and beveling of pipes. In the construction of many plants, particularly chemical plants, enormous quantities of pipes must be handled and it is highly desirable that these pipes should be cut, fitted and welded at the position of use. In the welding of pipes it is desirable that the ends to be abutted should be cleanly cut and bevelled to provide a V-shaped depression for the reception of the welding metal. If a machine such as that contemplated by the present invention is provided at the point of assembly of piping, sections of pipe may be cut to proper length, bevelled, assembled and welded advantageously.

A further object of the present invention is to provide a pipe cutting and beveling mechanism which is capable of handling pipes varying greatly in diameter and thickness. Only minor and simple adjustments are required in the mechanism to accompany these different pipe sizes.

A further object of the invention is to provide a mechanism of the type indicated which is safe in operation, particularly providing protection in the event of breakage of a cutting or grinding wheel.

Figure 1:
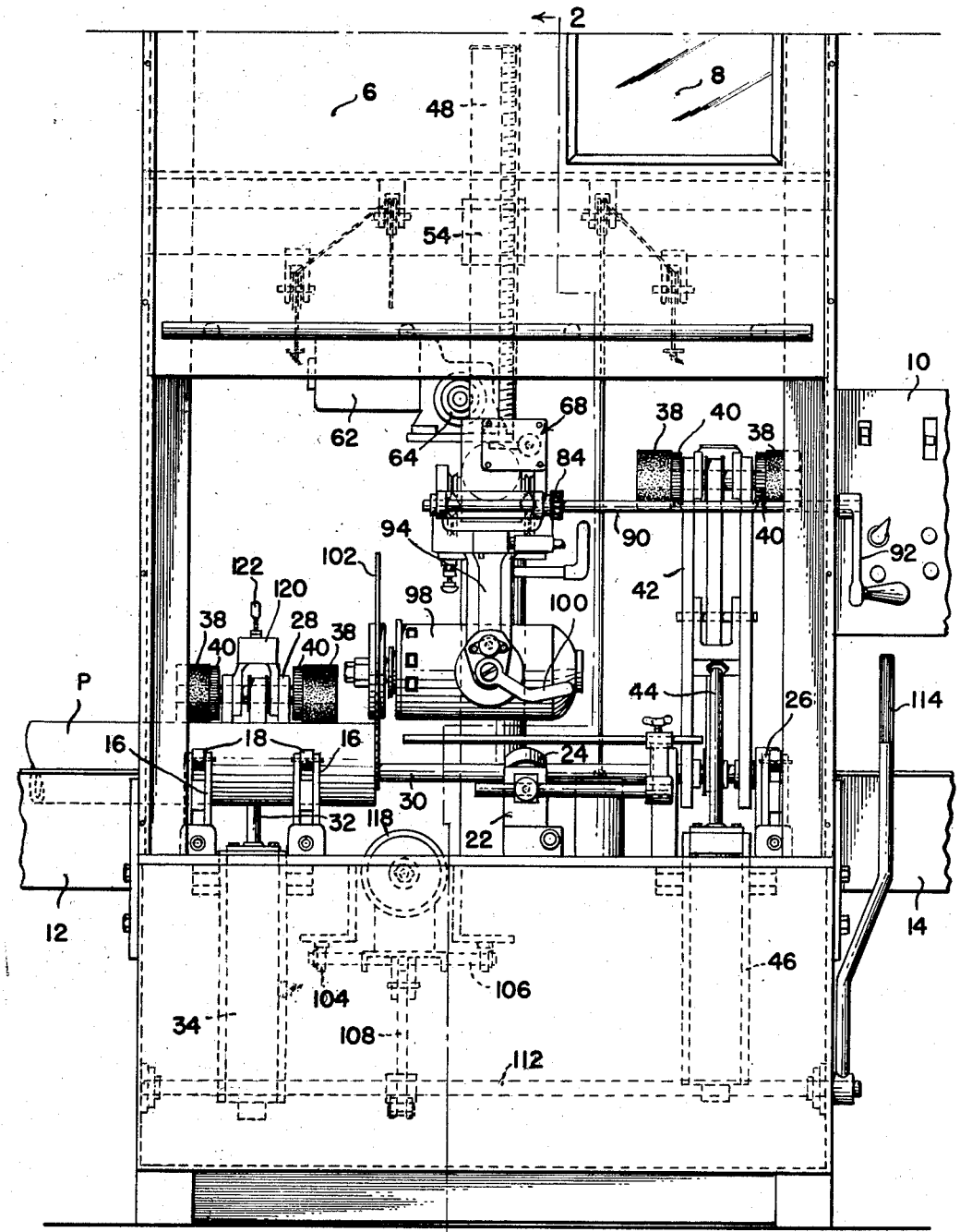
Figure 2:
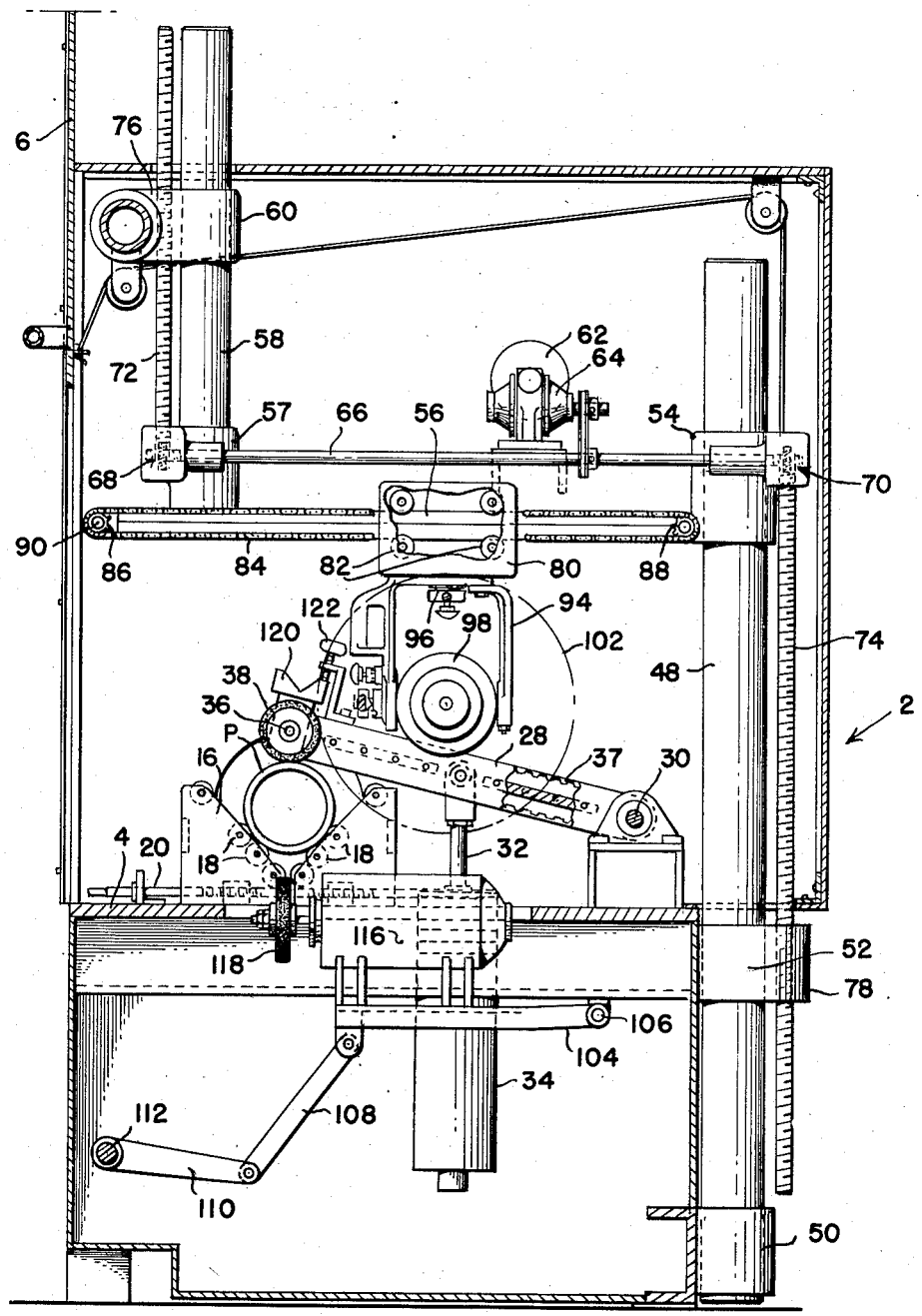

The foregoing and other objects of the invention particularly relating to details of construction and operation will become apparent from the following description read in conjunction with the accompanying drawings, in which:

Figure 1 is a front elevation of a preferred form of machine provided in accordance with the invention; and Figure 2 is a vertical section taken on the broken surface indicated at 2—2 in Figure 1.

The machine comprises a housing generally indicated at 2 made of structural steel parts and providing, in particular, above a horizontal table 4 a protective enclosure provided with a counterbalanced vertical sliding door 6 containing a window 8, desirably of shatterproof glass or transparent plastic through which an operator may view the operation of the machine. The enclosure is such as to afford protection against flying chips or parts of broken wheels as well as against dust, the enclosure being desirably vented by the use of a fan, not shown.

A control panel 10 located outside the housing suffices for control of the electrical and pneumatic devices of the machine, but since these controls individually are of conventional types they need not be described in detail.

A pair of troughs 12 and 14 extend laterally from the housing and are aligned with openings therein and with the operating region within the housing to provide for the introduction and removal of pipes, one of which is indicated at P in Figure 1. These troughs are provided with universal rollers, not shown, so that heavy pipe lengths may be moved longitudinally from the troughs into the housing. Within the housing and adjacent to the inner end of the trough 12 are a pair of saddles indicated at 16 each of which comprises two slides arranged to be adjusted relatively to each other by means of screw arrangements indicated at 20. The saddles are provided with rollers 18 to mount the end of a pipe for free rotation about its axis. In the central region of the housing there is another saddle 22 which is arranged for horizontal adjustments in the table 4. Desirably this saddle is provided with universal type ball supports 24.

Within the housing adjacent to the left-hand end of the trough 14 is a further saddle 26 which is similar to the saddles 16.

An arm 28 is journalled upon a shaft 30 which extends transversely of the machine and is arranged to be driven through a motor and reduction gearing which are not shown. The arm 28 is arranged to be raised and lowered about shaft 30 by a link connection 32 to the piston in an air cylinder 34 which is controlled from suitable devices on the panel 10. At its forward end the arm carries a shaft 36 which is provided with a pully arranged to be driven by a toothed belt 37 from a corresponding pully secured to the shaft 30. The shaft 36 carries drive rollers 38 faced with rubber or other resilient material and also with toothed drive members 40 which, by biting into a pipe upon compression of the resilient roller surfaces, serve to rotate a pipe. As will be evident from what has been described the air cylinder 34 may be operated either to effect release of the pipe or tight clamping of the pipe in the saddles while rotation is effected through the drive from shaft 30.

A corresponding arm and drive arrangement is provided at the other end of the machine, the arm being indicated at 42 and the operating linkage and cylinder at 44 and 46, respectively.

A fixed post 48 is mounted at the rear of the machine in bracket members 50 and 52. On post 48 there is vertically slidable a casting 54 which serves as a mounting for a pair of tracks 56 which are also secured to a casting 57 secured to a post 58 which is vertically slidable in a fixed mounting casting 60. A motor 62 drives through reduction gearing 64 a shaft 66 which through gearing 68 and 70 drives the respective screws 72 and 74. The first of these is mounted for rotation in a thrust bearing carried in the casting 57 and is threaded into a threaded nut portion 76 of the casting 60. The screw 74 is mounted in a thrust bearing in the casting 54 and is threaded at 78 into the fixed casting 52. It will be evident that as motor 62 is driven in one direction or the other under control of suitable switch means on panel 10 the tracks 56 are raised and lowered, remaining horizontal due to the fact that the screws 72 and 74 rotate at the same angular speed and have the same pitch.

A carriage 80 is provided with rollers 82 which mount it on the tracks 56 for back and forth movement within the housing. To control such movement the carriage is secured to one lap of a chain 84 which is trained over sprockets 86 and 88 mounted at the ends of the tracks, the former of the sprockets being secured to a shaft 90 which extends through the right-hand side of the housing where it is connected to a crank 92 through which an operator may move the carriage forwardly and rearwardly. While the feed could be power driven, it has been found more desirable to provide for a crank drive as shown since the operator can then "feel" the cutting action and adjust the rate of feed accordingly.

A yoke 94 is mounted on the carriage 80 to pivot about a vertical axis at 96 and serves in turn to mount about a horizontal axis the motor 98 of the cutting wheel 102 which may be adjusted in proper angular position by means of a clamp handle 100. The cutting wheel of abrasive type indicated at 102 is desirably of large diameter and is preferably enclosed except in its cutting region by a safety housing which is not illustrated.

At 106 there is pivoted a support 104 which is connected by a link 108 to an arm 110 carried by a shaft 112 to which, at the outside of the housing, there is secured a manipulating lever 114. The support 104 mounts a motor 116 on the shaft of which there is secured a grinding wheel 118 having its axis transverse to the axis of a pipe being bevelled.

A V-block arrangement indicated at 120 and pivoted on the shaft 36 may be rocked to a downward position to fixedly clamp a pipe P without rotation. This arrangement is desirable when angular cuts are to be made or saddle joints provided. During ordinary cut off operations the block 120 is held in operative position by a thumb screw 122.

The operation of the machine may now be described.

If a length of pipe is to be cut off it is mounted in the saddles 16 in position to be engaged and rotated by the members 38 and 40. With the wheel 102 in a plane at right angles to the axis of the pipe, and the wheel located in a proper vertical position, it is moved forwardly by manipulation of the pipe 92 to effect the cutting off action. This leaves a vertical plane face at the end of the pipe. Generally speaking it should then be bevelled and to effect this result the rotation of the pipe is continued while the manipulation of the lever 114 brings up to engagement with the periphery of the pipe end the grinding wheel 118 which produces a bevel. The trailing end of a pipe may also be bevelled by support in the saddles 22 and 26, rotation being effected by means of the feed elements 38 and 40 carried by the arm 42. In this case the direction of rotation of motor 116 is desirably reversed to produce the desired in-feed of the grinding wheel to the work.

For the making of angular cuts, the pipe is held stationary by the V-block 120 and the angular position of the wheel 102 adjusted in the yoke 94. By rotation of the yoke through 180° about a vertical axis both sides of a saddle may be cut in a pipe.

It will be evident that the machine is of quite universal adaptability to pipes of various sizes and wall thicknesses and consequently the machine is particularly useful at a construction position where large quantities of pipe must be cut, bevelled and assembled. It is to be understood that the invention is not to be regarded as limited except as required by the following claims.

What is claimed is:

1. In combination, a support structure, means rigidly mounted on said structure for supporting a length of pipe for rotary motion about its axis, said supporting means including two sets of rollers spaced longitudinally of a pipe supported thereby, means mounted on said structure for rotating a pipe supported by said supporting means, said rotating means comprising two rotary driving devices each positioned to engage a supported pipe adjacent to one of said two sets of rollers and means mounting said devices for movement toward and away from the pipe, and means for effecting cutting of the pipe.

2. In combination, a support structure, means rigidly mounted on said structure for supporting a length of pipe for rotary motion about its axis, said supporting means including a pair of saddles spaced longitudinally of a pipe supported thereby and mounting rollers engaging said pipe and rotatable on an axis extending longitudinally of said pipe, means mounted on said structure for rotating a pipe supported by said supporting means, said rotating means comprising a rotary driving device for engaging a pipe supported by said supporting means and means mounting said device for movement toward and away from the pipe, and means for effecting cutting of the pipe.

3. In combination, a support structure, means rigidly mounted on said structure for supporting a length of pipe for rotary motion about its axis, said supporting means including a pair of saddles spaced longitudinally of a pipe supported thereby, each of said saddles comprising two slides mounting rollers engaging said pipe and rotatable on an axis extending longitudinally of said pipe and means for moving said two slides substantially linearly toward and away from each other, means mounted on said structure for rotating a pipe supported by said supporting means, said rotating means comprising a rotary driving device for engaging a pipe supported by said supporting means and means mounting said device for movement toward and away from the pipe, and means for effecting cutting of the pipe.

4. In combination, a support structure, means rigidly mounted on said structure for supporting a length of pipe for rotary motion about its axis, means mounted on said structure for rotating a pipe supported by said supporting means, said rotating means comprising a rotary driving device for engaging a pipe supported by said supporting means and means mounting said device for movement toward and away from the pipe, said driving device including a resilient deformable roller and an adjacently positioned rigid toothed roller, said resilient roller being of greater diameter than said toothed roller and providing only engagement of said deformable roller and said pipe upon application of a relatively small force moving said device against said pipe and providing engagement of both said deformable roller and said toothed roller with said pipe upon the application of a relatively large force moving said device against said pipe, and means for effecting cutting of the pipe.

5. In combination, a support structure, means rigidly mounted on said structure for supporting a length of pipe for rotary motion about its axis, said supporting means including two sets of rollers spaced longitudinally of a pipe supported thereby, means mounted on said structure for rotating a pipe supported by said supporting means, said rotating means comprising two rotary driving devices each positioned to engage a supported pipe adjacent to one of said two sets of rollers and means mounting said devices for movement toward and away from the pipe, each of said driving devices including a resilient deformable roller and an adjacently positioned rigid toothed roller, said resilient roller being of greater diameter than said toothed roller and providing only engagement of said deformable roller and said pipe upon application of a relatively small force moving said device against said pipe and providing engagement of both said deformable roller and said toothed roller with said pipe upon the application of a relatively large force moving said device against said pipe, and means for effecting cutting of the pipe.

6. In combination, a support structure, means mounted on said structure for supporting a length of pipe for rotary motion about its axis, means mounted on said structure for rotating a pipe supported by said supporting means, said rotating means comprising a rotary driving device for engaging a pipe supported by said supporting means and means mounting said device for movement toward and away from the pipe, and means supported by said structure for mounting a cutting disc for effecting cutting of a pipe, said mounting means positioning said cutting disc with its axis of rotation extending longitudinally of a pipe and including means for rotating said axis of rotation around an axis extending transversely of a pipe.

7. In combination, a support structure, means mounted on said structure for supporting a length of pipe for rotating about its axis, means mounted on said structure for rotating a pipe supported by said supporting means, and means mounted on said structure for effecting bevelling of a pipe supported by said supporting means, said bevelling means comprising a grinding wheel movable into engagement with an end of the pipe and having its plane of rotation extending substantially perpendicular to a tangent to the outer surface of the pipe at the location of contact of the grinding wheel and the pipe.

8. In combination, a support structure, means mounted on said structure for supporting a length of pipe for rotary motion about its axis, means mounted on said structure for rotating a pipe supported by said supporting means, said rotating means comprising a rotary driving device for engaging a pipe supported by said supporting means and means mounting said device for movement toward and away from the pipe, means mounted on said structure for effecting cutting of the pipe, the last mentioned means comprising a cutting disc and means for mounting the cutting disc for movement transversely of the pipe and for vertical adjusting movements to accommodate different sizes of pipe, and means mounted on said structure for effecting bevelling of a pipe supported by said supporting means, said bevelling means comprising a grinding wheel movable into engagement with an end of the pipe and having its plane of rotation extending substantially perpendicular to a tangent to the outer surface of the pipe at the location of contact of the grinding wheel and the pipe.

References Cited in the file of this patent

UNITED STATES PATENTS

| | | |
|---|---|---|
| 1,184,973 | Lloyd | May 30, 1916 |
| 1,876,716 | Maynard | Sept. 13, 1932 |
| 2,284,257 | Bergstrom | May 26, 1942 |
| 2,327,663 | Bovard | Aug. 24, 1943 |
| 2,358,880 | Robinson | Sept. 26, 1944 |
| 2,437,002 | Riedling | Mar. 2, 1948 |
| 2,455,762 | Hall | Dec. 7, 1948 |
| 2,459,068 | Eastwood | Jan. 11, 1949 |
| 2,553,147 | Roescheise | May 15, 1951 |